United States Patent
McClure et al.

(10) Patent No.: US 6,850,928 B1
(45) Date of Patent: Feb. 1, 2005

(54) SYSTEM AND METHOD FOR AUTOMATICALLY RETRIEVING PROPRIETARY AND STANDARD DIRECTORY OBJECT FORMATS

(75) Inventors: James L. McClure, Lewisville, TX (US); Greg M. Vaudreuil, Dallas, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/481,648

(22) Filed: Jan. 12, 2000

(51) Int. Cl.[7] .............................................. G06F 17/30
(52) U.S. Cl. ......................... 707/3; 707/10; 707/101; 707/103
(58) Field of Search ..................... 707/10, 103, 101, 707/3

(56) References Cited

U.S. PATENT DOCUMENTS

| | | | | |
|---|---|---|---|---|
| 4,625,308 A | * | 11/1986 | Kim et al. .................. 370/207 |
| 5,806,061 A | * | 9/1998 | Chaudhuri et al. ............ 707/3 |
| 5,978,373 A | * | 11/1999 | Hoff et al. .................. 370/392 |
| 6,085,188 A | * | 7/2000 | Bachmann et al. ............ 707/3 |
| 6,094,227 A | * | 7/2000 | Guimier ..................... 348/459 |
| H1880 H | * | 10/2000 | Vines et al. ................ 370/310 |
| 6,292,799 B1 | * | 9/2001 | Peek et al. .................. 707/10 |
| 6,347,312 B1 | * | 2/2002 | Byrne et al. ................ 707/3 |
| 6,363,375 B1 | * | 3/2002 | Hoshino et al. ............. 707/3 |
| 6,377,950 B1 | * | 4/2002 | Peters et al. ............... 707/10 |

OTHER PUBLICATIONS

Charles Severance, Could LDAP be the Next killer DAP? Aug. 1998, p. 88–89.*

* cited by examiner

*Primary Examiner*—Jean M. Corrielus
*Assistant Examiner*—Cam Truong

(57) ABSTRACT

A system for, and method of, automatically retrieving a directory object from a database and a directory server incorporating the system or the method. In one embodiment, the system includes: (1) a request reception module that receives a Lightweight Directory Access Protocol (LDAP) request for an attribute of the directory object that is expressed in a proprietary format and (2) a request fulfillment module, associated with the request reception module. If the directory object contains the attribute expressed in the proprietary format, the request fulfillment module retrieves the attribute expressed in the proprietary format from the database. If the directory object does not contain the attribute expressed in the proprietary format, the request fulfillment module retrieves the attribute expressed in a standard format from the database and recasts the attribute expressed in the standard format as the attribute expressed in the proprietary format.

32 Claims, 3 Drawing Sheets

SYSTEM AND METHOD FOR AUTOMATICALLY RETRIEVING PROPRIETARY AND STANDARD DIRECTORY OBJECT FORMATS

TECHNICAL FIELD OF THE INVENTION

The present invention is directed, in general, to voice messaging systems and, more specifically, to a system and method for automatically retrieving proprietary and standard directory object formats from such systems.

BACKGROUND OF THE INVENTION

Almost from their beginning, computer systems had problems retrieving data across the computer networks. One computer system required one data format which was different than the data format required by another computer system. Soon thereafter, the industry developed standards for the data formats being used over computer networks. However, in order for companies to obtain a competitive edge, new and better hardware was developed. The new and better hardware also required new proprietary data formats to accommodate the new hardware.

A problem soon arose, how to maintain compatibility with older systems that required a standard data format while using new hardware that required a proprietary format on the same network. The industry tried using the Lightweight Directory Access Protocol ("LDAP") to solve the problem of proprietary formats and standard formats. However, LDAP did not provide the means to efficiently select one of the multiple variations of formats without retrieving all of the variations of formats.

Users that required a specific format first tried retrieving all the formats available and then selecting the best format from the retrieved formats. This method resulted in increased network traffic just to find one format. Users also tried sending an LDAP request for each format that was supported until one was found. Again, the method caused needless network traffic. Another method was to send an LDAP request for a list of the supported formats, then send a second LDAP request for one format from the supported formats. All of these methods incurred excess time and needless network traffic. If the formats requested were for data intensive voice, sending multiple versions of the same attribute increased the network bandwidth and time required to send the information. Therefore, what is needed in the art is a better way to retrieve proprietary formats and standard formats using LDAP.

SUMMARY OF THE INVENTION

To address the above-discussed deficiencies of the prior art, the present invention provides, in one embodiment, a system for, and method of, automatically retrieving a directory object from a database and a directory server incorporating the system or the method. In one embodiment, the system includes: (1) a request reception module that receives a Lightweight Directory Access Protocol (LDAP) request for an attribute of the directory object that is expressed in a proprietary format and (2) a request fulfillment module, associated with the request reception module. If the directory object contains the attribute expressed in the proprietary format, the request fulfillment module retrieves the attribute expressed in the proprietary format from the database. If the directory object does not contain the attribute expressed in the proprietary format, the request fulfillment module retrieves the attribute expressed in a standard format from the database and recasts the attribute expressed in the standard format as the attribute expressed in the proprietary format. "Recast" is defined for purposes of the present invention as being altered to appear to LDAP as being of a different format from what it actually is. For example, an attribute expressed in a standard format may be altered (perhaps by changing header information) such that it appears to LDAP to be an attribute expressed in a proprietary format, and therefore a proper response to a given LDAP request. The format of the attribute remains unchanged; only the way it appears to LDAP has been "recast."

The present invention therefore introduces the broad concept of responding to LDAP requests in a more intelligent and flexible manner. The present invention enjoys substantial utility in that it eliminates requests for unavailable attributes (amounting to failed guesses), and therefore uses less network bandwidth compared to prior art systems that respond to LDAP requests.

In one embodiment of the present invention, the request fulfillment module responds to the LDAP request with an LDAP response including an indication of a format of the attribute. In an embodiment to be illustrated and described, the indication takes the form of a code that corresponds to a given proprietary or standard format. In a more specific embodiment of the present invention, the indication is of a standard type. Thus, a format proprietary to Lucent Technologies (for example) may have a standard type indication of "Audio/vnd.octel.sbc." A standard format may have a standard type indication of "Audio/32KADPCM." Of course, the present invention is not limited to a particular standard type indication.

In one embodiment of the present invention, the attribute is a sampled stream of data and may be, for example, a sampled stream of spoken voice data. In an embodiment to be illustrated and described, the data is spoken voice data that is transmitted back to the requesting entity (such as a voice mail system), thereby identifying the person corresponding to the directory object.

In one embodiment of the present invention, the standard format is characterized by a 32 kilobit data rate. In a related embodiment of the present invention, the proprietary format is selected from the group consisting of: (1) a format characterized by a 16 kilobit data rate, (2) a format characterized by a 24 kilobit data rate, (3) a textual attribute and (4) a graphic image. Of course, the present invention is not limited to a particular set of standard or proprietary formats.

In one embodiment of the present invention, the directory object includes the attribute expressed in a plurality of proprietary formats. The attribute may be expressed in, for example, two separate proprietary formats and one standard format. Each directory object in a database could have attributes expressed in different, and different numbers of, formats.

In another embodiment, the present invention provides a system for provisioning a database including: (1) a provisioning module, associated with the database, that causes data associable with one of the directory objects and expressed in a standard format to be stored in the database and associated with the directory object both as a standard format attribute and as a proprietary format attribute and (2) a request fulfillment module, associated with the database, that, in response to receipt of a LDAP request for an attribute expressed in the proprietary format, retrieves the attribute expressed in the proprietary format containing data expressed in the standard format. In contrast to the earlier described embodiment, this embodiment of the present invention provisions the database ahead of time to accommodate format substitutions, thereby avoiding the need for an intelligent server to substitute formats on-the-fly.

The present invention further introduces an intelligent directory client, including: (1) a request generation module that generates a Lightweight Directory Access Protocol (LDAP) request for a proprietary format attribute of a directory object contained in a directory server and (2) an attribute parsing module, associated with the request generation module, that parses the proprietary format attribute received in response to the request to determine a format in which the attribute is actually expressed. Because substitution can occur at the directory server, a directory client capable of recognizing when a substitution has occurred is advantageous and of substantial utility.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
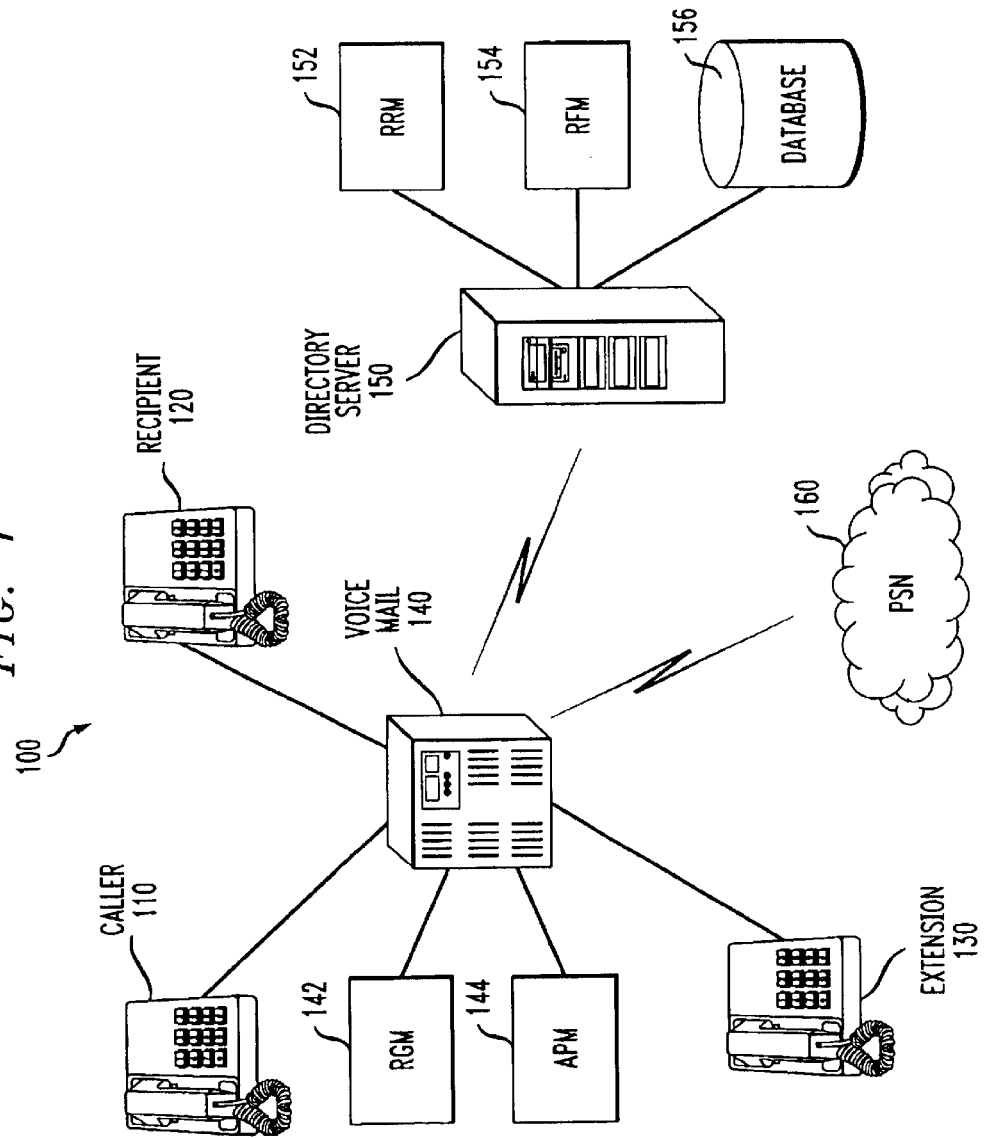
FIG. 1 illustrates a block diagram of a system for voice name confirmation that forms one environment within which the present invention can operate.

Referring initially to FIG. 1, illustrated is a block diagram of a system for voice name confirmation, generally designated 100, that forms one environment within which the present invention can operate. In the illustrated embodiment, the system 100 includes a voice mail server 140 that is capable of being a directory client. A directory client is a device or software that can generate Lightweight Directory Access Protocol ("LDAP") requests and receive LDAP responses. One skilled in the art is familiar with and the use of LDAP requests and responses.

The voice mail server 140 includes a request generation module 142 and an attribute parsing module 144. The request generation module 142 generates LDAP requests for a proprietary format attribute. A proprietary format attribute is also referred as an attribute expressed in a proprietary format.

The attribute parsing module 144 is associated with the request generation module 142 and parses the proprietary format attribute received in response to the LDAP request to determine a format in which the proprietary format attribute is actually expressed. In the illustrated embodiment, the proprietary format attribute received in the LDAP response may not be expressed in the format requested. This may be due to substitution when the desired format is not available. Therefore, the attribute parsing module 144 must determine in which format the returned proprietary format attribute is actually expressed to be able to use the attribute. In another embodiment, the attribute parsing module 144 can use an indication of the format returned in an LDAP response to aid in the parsing of the proprietary format attribute.

The voice mail server 140 is also coupled to a caller station 110, a recipient station 120 and an extension station 130. The caller station 110, the recipient station 120 and the extension station 130 may be conventional telephones that are capable of communicating with voice mail systems. Of course, the system 100 is not limited to the particular number of stations 110, 120, 130 or voice mail servers 140. In another embodiment, the caller station 110, the recipient station 120 or the extension station 130 may be any device, such as conventional personal computers, that is capable of communicating with the voice mail server 140.

The voice mail server 140 processes communication requests from each of the stations 110, 120, 130. The voice mail server 140 may also process extension dialing communication requests and provide voice mail if one of the stations 110, 120, 130 are unavailable or in use. The voice mail server 140 is also coupled to the public switched network ("PSN") 160 and may process inbound and outbound calls to or from the PSN 160.

Also coupled to the voice mail server 140 is a directory server 150. The directory server 150 can be a conventional computer, server or main frame computer. The directory server 150 can receive and process LDAP requests from the voice mail server 140. The directory sever 150 also communicates with the voice mail server 140 over a network, a telephone connection, or over other communications topologies (not shown). In another embodiment, the directory server 150 may process LDAP requests from other systems and devices coupled to it. Yet in another embodiment, the directory server 150 may be incorporated in the voice mail server 140 as software, firmware, hardware or any combination thereof.

The directory server 150 also includes a database 156, a request reception module 152 and a request fulfillment module 154. The database 156 comprises directory objects (not shown) that contain various types of information or data. Each element or piece of data within a directory object is called an attribute. In the illustrated embodiment, the database 156 comprises directory objects that contain a sampled stream of spoken voice data and an indication of the format of the sampled stream of spoken voice data. Both the sampled stream of spoken voice data and the indication of the format are called attributes of a directory object. One skilled in the art is familiar with and the use of LDAP directory objects and attributes.

The database 156 also comprises directory objects that include attributes expressed in a proprietary format and a standard format. For example, if the attributes are sampled streams of spoken voice data, a Proprietary format could be a 16 kilobit Adaptive Pulse Code Modulation ("ADPCM") format and the standard format could be a 32 kilobit ADPCM format. However, the present invention is not limited to these formats. Nor is the present invention limited to using only sampled streams of spoken voice data as attributes of a directory object. In other embodiments of the present invention, the attributes could be a textual attribute, a graphic image, or other types of information accessible via LDAP requests.

Associated with the database 156 is the request reception module 152 and may be embodied in software on a conventional computer system. The request reception module 152 also receives the LDAP requests from the voice mail server 140. In the illustrated embodiment, the request reception module 152 may receive an LDAP request from the voice mail server 140 for a sampled stream of spoken voice data in a proprietary format. In another embodiment, the request reception module 152 may also receive LDAP requests from any device capable of sending an LDAP request.

The request fulfillment module 154 is associated with the request reception module 152 and may be embodied in software on a conventional computer system. Using the LDAP request, the request fulfillment module 154 retrieves the requested directory object's attribute from the database 156. If the LDAP request is for an attribute expressed in a proprietary format and the database's directory object contains the attribute expressed in that proprietary format, the request fulfillment module 154 retrieves the desired attribute and sends an LDAP response with the retrieved attribute.

However, if the database 156 does not contain the attribute expressed in that particular proprietary format, the request fulfillment module 154 retrieves the attribute expressed in a standard format from the database 156 and sends an LDAP response containing the attribute expressed in the standard format recasted as the attribute expressed in the proprietary format. In one embodiment of the present invention, the request fulfillment module 154 responds to the LDAP request with an LDAP response including an indication of the format of the attribute.

In another embodiment of the present invention, the indication of the format of the attribute is a standard type. A standard type is a standard value assigned to a defined mnemonic that is available on the Internet or other locations where standard types are registered. For example, an indication for a proprietary format may be "Audio/vnd.octel.sbc" and an indication for a standard format may be "Audio/32KADPCM."

One example of voice name confirmation starts with the caller station 110 entering the phone number of the recipient station 120. Upon entering the recipient station 120 phone number, the voice mail server's request generation module 142 generates an LDAP request for a sampled stream of spoken voice data expressed in a proprietary format. The voice mail server 140 sends the LDAP request to the directory server 150. The voice mail server 140 is requesting the spoken name associated with the recipient station's phone number. Also, the voice mail server 140 has requested a proprietary format to accommodate proprietary equipment, to use less network bandwidth or a combination of the two.

The request reception module 152 receives the LDAP request and passes it to the request fulfillment module 154. The request fulfillment module 154 queries the database 156 for a directory object's attribute expressed in the proprietary format. In this example, the proprietary format is a sampled stream of spoken voice data characterized by a 16 kilobit data rate. Of course, sampled streams of spoken voice data characterized in other data rates are within the broad scope of this invention.

If the attribute expressed in the proprietary format exists, the request fulfillment module 154 sends an LDAP response containing the attribute to the voice mail system 140. The attribute parsing module 144 parses the received attribute to determine the format in which the attribute is actually expressed. In this example, the attribute is actually expressed in the proprietary format. The voice mail system 140, using an appropriate device or routines for a proprietary format, plays the sampled stream of spoken voice data to the caller station 110. The caller station 110 confirms that the spoken name is the name of the person intended to be called. If the spoken name is correct, the caller station 110 enters a confirmation and the voice mail server 140 calls recipient station 120.

If the database 156 did not contain the directory object's attribute expressed in the proprietary format, the request fulfillment module 154 retrieves the directory object's attribute expressed in the standard format. The request fulfillment module 154 sends an LDAP response containing the attribute expressed in the standard format to the voice mail system 140. In this example, the standard format is a sampled stream of spoken voice data characterized by a 32 kilobit data rate. In another embodiment, the request fulfillment module 154 also sends an indication of the format of the attribute in the LDAP response.

The attribute parsing module 144 parses the received attribute to determine the format in which the attribute is actually expressed. In this example, the attribute is actually expressed in the standard format. The voice mail system 140, using an appropriate device or routines for a standard format, plays the sampled stream of spoken voice data to the caller station 110. The caller station 110 confirms that the spoken name is the name of the person intended to be called. If the spoken name is correct, the caller station 110 enters a confirmation and the voice mail server 140 calls recipient station 120.

In the illustrated embodiment of the present invention, the processing of LDAP requests for attributes expressed in proprietary formats is enhanced. With the present invention, a single LDAP request can be issued from the client to the directory server. If the proprietary format does not exist, the attribute expressed in the standard format is returned. The client no longer has to request a proprietary format and then have to send another request for a standard format if the proprietary format did not exist.

The enhancement of a single LDAP request also saves on network bandwidth. For example, attributes consisting of sampled streams of spoken voice data require a larger bandwidth than textual information. If a client has to send two requests for voice data, one for proprietary format and one for standard format, then the amount of network bandwidth used is increased in order to handle both requests. The use of single LDAP request to obtain an attribute in either a proprietary format or a standard format reduces the amount of time and network bandwidth needed to obtain the desired information. Also, for time critical systems, the ability to use one LDAP request, instead of two LDAP requests, reduces the time required to obtain the desired attribute if no proprietary format exists for that attribute.

Another example of the versatility of the present invention is in textual substitution (not shown). In one example of textual substitution, the database 156 contains directory objects that are provisioned with a person's name in Kanji characters as the proprietary format and a person's name in English characters as the standard format. A directory client desiring to show a person's name in Kanji could send an LDAP request to the directory server 150 for the attribute expressed in the proprietary format (Kanji characters). If the directory client sends an LDAP request for an attribute expressed in the proprietary format and the proprietary format does not exist in the database 156, the LDAP response would contain the attribute expressed in the standard format (person's name in English characters) recasted as the attribute expressed in the proprietary format. Thus, one embodiment of the present invention has the versatility of language substitution when the proprietary format does not exist in a database.

Graphic image substitution is another example of the versatility of the present invention (not shown). In graphic image substitution, the directory objects include a proprietary format containing a Graphics Interchange Format ("GIF") image of a person and a standard format containing a Tag Image File Format ("TIFF") image of the same person. The directory client can send LDAP requests to the directory server 150 to retrieve the GIF image of the person. If the proprietary format (GIFF image) does not exist on the database, the LDAP response will contain the standard format (TIFF image) recasted as the proprietary format. Thus, one embodiment of the present invention allows graphic image substitution when the proprietary format (preferred graphic image) does not exist in the database.

The present invention is not limited to the use of attributes that are sampled stream of spoken voice data, text, or graphic images. Nor is the system limited to one proprietary format or standard format. In one embodiment of the present invention, the system allows the directory server 150 to be used with systems requiring attributes expressed in proprietary formats while still being able to handle LDAP requests from systems using attributes expressed in a standard format. In another embodiment of the present invention, the request reception module 152 and the request fulfillment module 154 may be embodied in hardware, firmware or the combination of the two.

Figure 2:
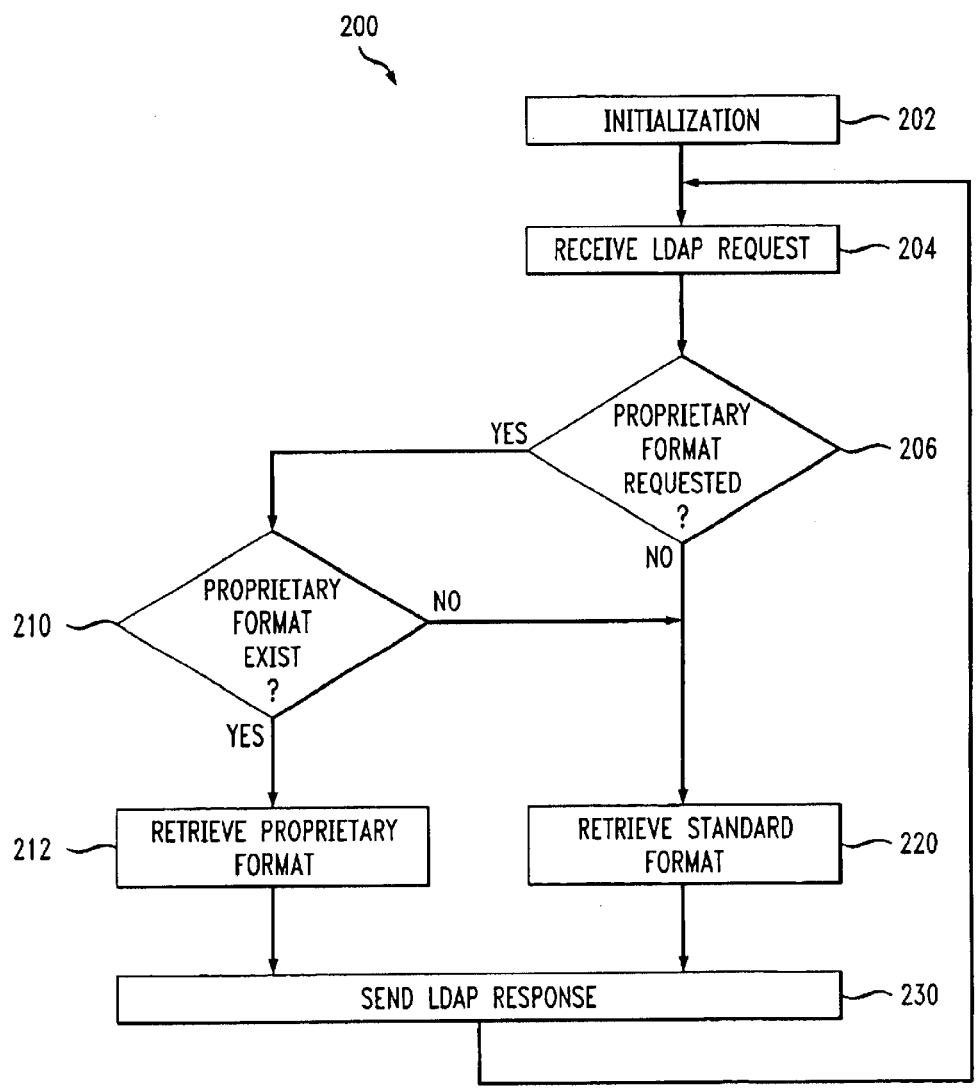
FIG. 2 illustrates a flow diagram of a method of automatically retrieving an attribute of a directory object expressed in a proprietary or standard format.

Turning now to FIG. 2, illustrated is a flow diagram of a method of automatically retrieving an attribute of a directory object expressed in a proprietary or standard format. In FIG. 2, the directory server first performs initialization and starts the directory service in a step 202.

After initialization, the directory server's request reception module receives an LDAP request for an attribute of a directory object from a requester in a step 204. Next, the request fulfillment module determines if the LDAP request is for an attribute expressed in a proprietary format in a decisional step 206. If the LDAP request is for a proprietary format, the request fulfillment module queries the database and determines if the attribute expressed in the proprietary format exists in a decisional step 210.

If the attribute expressed in the proprietary format does exist, the request fulfillment module retrieves the attribute expressed in the proprietary format from the database in a step 212. Next, the request fulfillment module sends an LDAP response containing the attribute to the requester in a step 230. The directory server then returns to await reception of another LDAP request in the step 204. In another embodiment, the request fulfillment module includes an indication of the format of the attribute in the LDAP response.

If the database does not contain the requested attribute expressed in the proprietary format or if no proprietary format was requested, the request fulfillment module retrieves the attribute expressed in a standard format in a step 220. Next, the request fulfillment module sends an LDAP response containing the attribute to the requester in the step 230. In another embodiment, if the requested format was for an attribute expressed in the proprietary format, the request fulfillment module sends the attribute expressed in the standard format attribute recasted as the attribute expressed in the proprietary format in the step 230. The directory server then returns to await reception of another LDAP request in the step 204.

One skilled in the art should know that the present invention is not limited to checking for one proprietary format. In another embodiment of the present invention, the request fulfillment module can process multiple types of proprietary formats and standard formats. Also, other embodiments of the present invention may have additional or fewer steps than described above.

Figure 3:
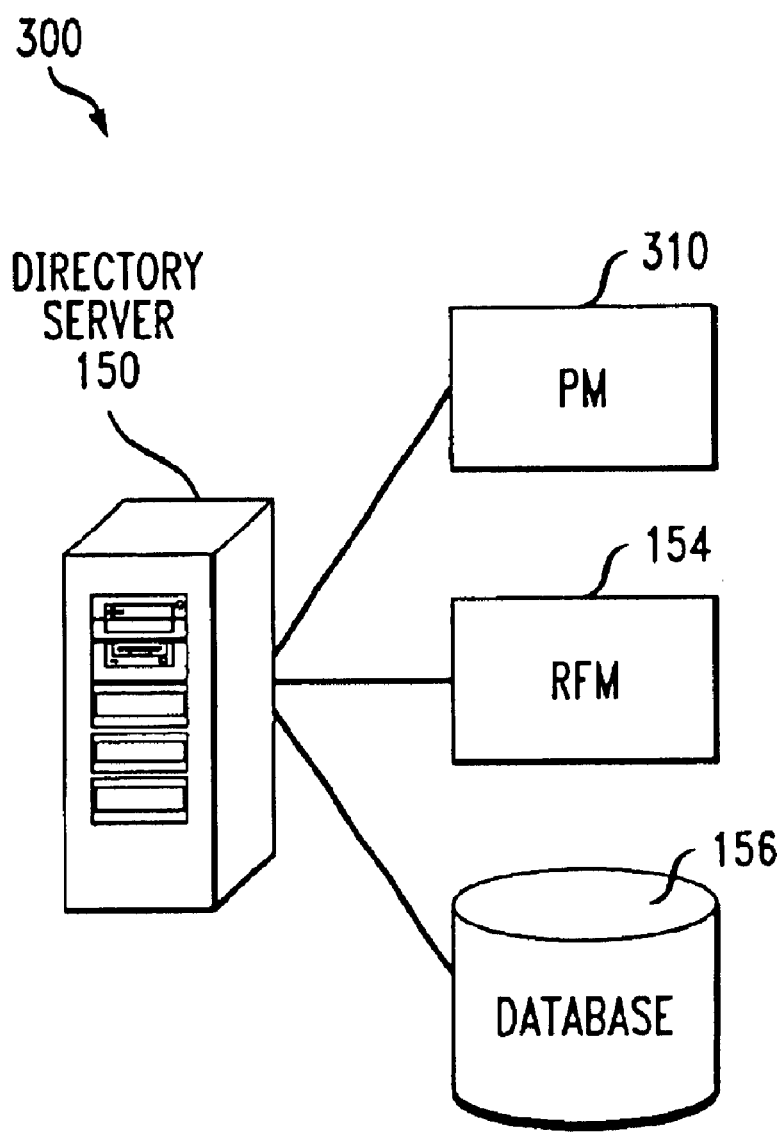
FIG. 3 illustrates an alternate embodiment of a directory server constructed according the principles of the present invention.

Turning now to FIG. 3, illustrated is an alternate embodiment of a directory server constructed according to the principles of the present invention. The directory server 150, in this alternate embodiment, is similar to the embodiment described in FIG. 1 with a few differences to be discussed.

In this alternate embodiment, the directory server comprises the database 156, a provisioning module 310 and the request fulfillment module 154. The database 156 contains a plurality of directory objects having attributes associated therewith. However, the database 156 has not been provisioned at this time.

The provisioning module 310 is associated with the database 156 and causes data associable with the directory objects to be provisioned. The provisioning module 310 stores the data associable with the directory object and expressed in a standard format both as a standard format attribute and as a proprietary format attribute. This results in the directory object's standard format attribute and proprietary format attribute containing the same data expressed in a standard format. For example, in the illustrated example of FIG. 1 using sampled streams of spoken voice data, each directory object would contain a standard format attribute and a proprietary format attribute having a sampled stream of spoken voice data characterized by a 32 kilobit ADPCM format.

The request fulfillment module 154 is associated with the database 156 and processes LDAP requests for attributes. In response to an LDAP request for an attribute expressed in a proprietary format, the request fulfillment module 154 retrieves instead the attributed expressed in the standard format. Since the provisioning module 310 stored the attributed expressed in the standard format in both the proprietary format attribute and the standard format attribute, any retrieval from the database 156 would result in an attribute expressed in the standard format. This alternate embodiment does not require additional directory server logic to handle both proprietary and standard formats.

In a related embodiment of the present invention, the request fulfillment module 154 responds to the LDAP request with an LDAP response including an indication of the format of the attribute. In another related embodiment of the present invention, the indication of the format of the attribute is a standard type.

Although the present invention has been described in detail, those skilled in the art should understand that they can make various changes, substitutions and alterations herein without departing from the spirit and scope of the invention in its broadest form.

What is claimed is:

1. A system for automatically retrieving a directory object from a database, comprising:
   a request reception module that receives a Lightweight Directory Access Protocol (LDAP) request for an attribute of said directory object that is expressed in a proprietary format; and a request fulfillment module, associated with said request reception module, that, if said directory object contains said attribute expressed in said proprietary format, retrieves said attribute expressed in said proprietary format from said database and responds to said LDAP request with an LDAP response including said attribute expressed in said proprietary format and, if said directory object does not contain said attribute expressed in said proprietary format, retrieves said attribute expressed in a standard format from said database and responds to said LDAP request with an LDAP response including said attribute expressed in said standard format recast to appear to LDAP as if said attribute were expressed in said proprietary format even though said attribute in said response is actually expressed in said standard format.

2. The system as recited in claim 1 wherein said request fulfillment module responds to said LDAP request with an LDAP response including an indication of a format of said attribute.

3. The system as recited in claim 2 wherein said indication is of a standard type.

4. The system as recited in claim 1 wherein said attribute is a sampled stream of data.

5. The system as recited in claim 1 wherein said standard format is characterized by a 32 kilobit data rate.

6. A system for automatically retrieving a directory object from a database, comprising:
  a request reception module that receives a Lightweight Directory Access Protocol (LDAP) request for an attribute of said directory object that is expressed in a proprietary format; and
  a request fulfillment module, associated with said request reception module, that, if said directory object contains said attribute expressed in said proprietary format, retrieves said attribute expressed in said proprietary format from said database and, if said directory object does not contain said attribute expressed in said proprietary format, retrieves said attribute expressed in a standard format from said database and recasts said attribute expressed in said standard format as said attribute expressed in said proprietary format, wherein said proprietary format is selected from the group consisting of: a format characterized by a 16 kilobit data rate, a format characterized by a 24 kilobit data rate, a textual attribute, and a graphic image.

7. The system as recited in claim 1 wherein said directory object includes said attribute expressed in a plurality of proprietary formats.

8. A method of automatically retrieving a directory object from a database, comprising:
  receiving a Lightweight Directory Access Protocol (LDAP) request for an attribute of said directory object that is expressed in a proprietary format;
  retrieving said attribute expressed in said proprietary format from said database if said directory object contains said attribute expressed in said proprietary format and responding to said LDAP request with an LDAP response including said attribute expressed in said proprietary format; and
  retrieving said attribute expressed in a standard format from said database if said directory object does not contain said attribute expressed in said proprietary format and responding to said LDAP request with an LDAP response including said attribute expressed in said standard format recast to appear to LDAP as if said attribute were expressed in said proprietary format even though said attribute in said response is actually expressed in said standard format.

9. The method as recited in claim 8 further comprises responding to said LDAP request with an LDAP response including an indication of a format of said attribute.

10. The method as recited in claim 9 wherein said indication is of a standard type.

11. The method as recited in claim 8 wherein said attribute is a sampled stream of data.

12. The method as recited in claim 8 wherein said standard format is characterized by a 32 kilobit data rate.

13. A method of automatically retrieving a directory object from a database, comprising:
  receiving a Lightweight Directory Access Protocol (LDAP) request for an attribute of said directory object that is expressed in a proprietary format;
  retrieving said attribute expressed in said proprietary format from said database if said directory object contains said attribute expressed in said proprietary format; and
  retrieving said attribute expressed in a standard format from said database if said directory object does not contain said attribute expressed in said proprietary format and recast said attribute expressed in said standard format as said attribute expressed in said proprietary format, wherein said proprietary format is selected from the group consisting of: a format characterized by a 16 kilobit data rate, a format characterized by a 24 kilobit data rate, a textual attribute, and a graphic image.

14. The method as recited in claim 8 wherein said directory object includes said attribute expressed in a plurality of proprietary formats.

15. A directory server, comprising:
  a database containing a plurality of directory objects having sampled streams of spoken voice data associated therewith;
  a request reception module, associated with said database, that receives a Lightweight Directory Access Protocol (LDAP) request for an attribute of said directory object that is expressed in a proprietary format; and
  a request fulfillment module, associated with said request reception module, that:
    if said attribute contained in said database is expressed in said proprietary format, retrieves said attribute expressed in said proprietary format from said database and responds to said LDAP request with an LDAP response including said attribute expressed in said proprietary format, and
    if said attribute is not expressed in said proprietary format, retrieves said attribute expressed in a standard format from said database and responds to said LDAP request with an LDAP response including said attribute expressed in said standard format recast to appear as if said attribute were expressed in said proprietary format even though said attribute in said response is actually expressed in said standard format.

16. The directory server as recited in claim 15 wherein said request fulfillment module responds to said LDAP request with an LDAP response including an indication of a format of said attribute.

17. The directory server as recited in claim 16 wherein said indication is of a standard type.

18. The directory server as recited in claim 15 wherein said standard format is characterized by a 32 kilobit data rate.

19. The directory server as recited in claim 15 wherein said directory objects include multiple sampled streams of spoken voice data expressed in a plurality of proprietary formats.

20. A directory server, comprising:
a database containing a plurality of directory objects having sampled streams of spoken voice data associated therewith;
a request reception module, associated with said database, that receives a Lightweight Directory Access Protocol (LDAP) request for an attribute of said directory object that is expressed in a proprietary format; and
a request fulfillment module, associated with said request reception module, that:
if said attribute contained in said database is expressed in said proprietary format, retrieves said attribute expressed in said proprietary format from said database,
if said attribute is not expressed in said proprietary format, retrieves said attribute expressed in a standard format from said database and recasts said attribute expressed in said standard format as said attribute expressed in said proprietary format, and wherein said proprietary format is selected from the group consisting of: a format characterized by a 16 kilobit data rate, a format characterized by a 24 kilobit data rate, a textual attribute, and a graphic image.

21. A directory server, comprising:
a database for containing a plurality of directory objects haring attributes associable therewith;
a provisioning module, associated with said database, that causes data associable with one of said directory objects and expressed in a standard format to be stored in said database and associated with said directory object both its a standard format attribute and as a proprietary format attribute;
and a request fulfillment module, associated with said database, that, in response to receipt of a Lightweight Directory Access Protocol (LDAP) request for an attribute expressed in said proprietary format, retrieves said attribute expressed in said proprietary format from said database, if said directory object contains said attribute expressed in said proprietary format, and responds to said LDAP request with an LDAP response including said attribute expressed in said proprietary format and, if said directory object does not contain said attribute expressed in said proprietary format, retrieves said attribute expressed in a standard format from said database and responds to said LDAF request with an LDAP response including said attribute expressed in said standard format recast to appear to LDAP as if said attribute were expressed in said proprietary format even though said attribute in said response is actually expressed in said standard format.

22. The directory server as recited in claim 21 wherein said request fulfillment module responds to said LDAP request with an LDAP response including an indication of a format of said attribute.

23. The directory server as recited in claim 22 wherein said indication is of a standard type.

24. The directory server as recited in claim 21 wherein said standard format is characterized by a 32 kilobit data rate.

25. The directory server as recited in claim 21 wherein said directory objects include multiple sampled streams of spoken voice data expressed in a plurality of proprietary formats.

26. A directory server, comprising:
a database for containing a plurality of directory objects having attributes associable therewith;
a provisioning module, associated with said database, that causes data associable with one of said directory objects and expressed in a standard format to be stored in said database and associated with said directory object both as a standard format attribute and as a proprietary format attribute; and
a request fulfillment module, associated with said database, that, in response to receipt of a Lightweight Directory Access Protocol (LDAP) request for an attribute expressed in said proprietary format, retrieves said attribute expressed in said proprietary format containing data expressed in said standard format, wherein said proprietary format is selected from the group consisting of: a format characterized by a 16 kilobit data rate, a format characterized by a 24 kilobit data rate, a textual attribute, and a graphic image.

27. A directory client, comprising:
a request generation module that generates a Lightweight Directory Access Protocol (LDAP) request for a proprietary format; attribute of a directory object contained in a directory server; and
an attribute parsing module, associated with said request generation module, that parses said proprietary format attribute received in response to said request to determine a format in which said attribute is actually expressed from said database and, if said directory object contains said attribute expressed in said proprietary format, determines that said attribute is expressed in said proprietary format and if said directory object does not contain said attribute expressed in said proprietary format, determines said attribute is expressed in a standard format from said database and determines a response to said LDAP request will include said attribute expressed in said standard format recast to appear to LDAP as if said attribute were expressed in said proprietary format even though said attribute in said response is actually expressed in said standard format.

28. The directory client as recited in claim 27 wherein said proprietary format attribute includes an indication of a format of said attribute.

29. The directory client as recited in claim 28 wherein said indication is of a standard type.

30. The directory client as recited in claim 27 wherein said format in which said attribute is actually expressed is characterized by a 32 kilobit data rate.

31. The directory client as recited in claim 27 wherein said directory objects include multiple sampled streams of spoken voice data expressed in a plurality of proprietary formats.

32. A directory client, comprising:
a request generation module that generates a Lightweight Directory Access Protocol (LDAP) request for a proprietary format attribute of a directory object contained in a directory server; and
an attribute parsing module, associated with said request generation module, that parses said proprietary format attribute received in response to said request to determine a format in which said attribute is actually expressed, wherein said format in which said attribute is actually expressed is selected from the group consisting of: a format characterized by a 16 kilobit data rate, a format characterized by a 24 kilobit data rate, a textual attribute, and a graphic image.

* * * * *